UNITED STATES PATENT OFFICE.

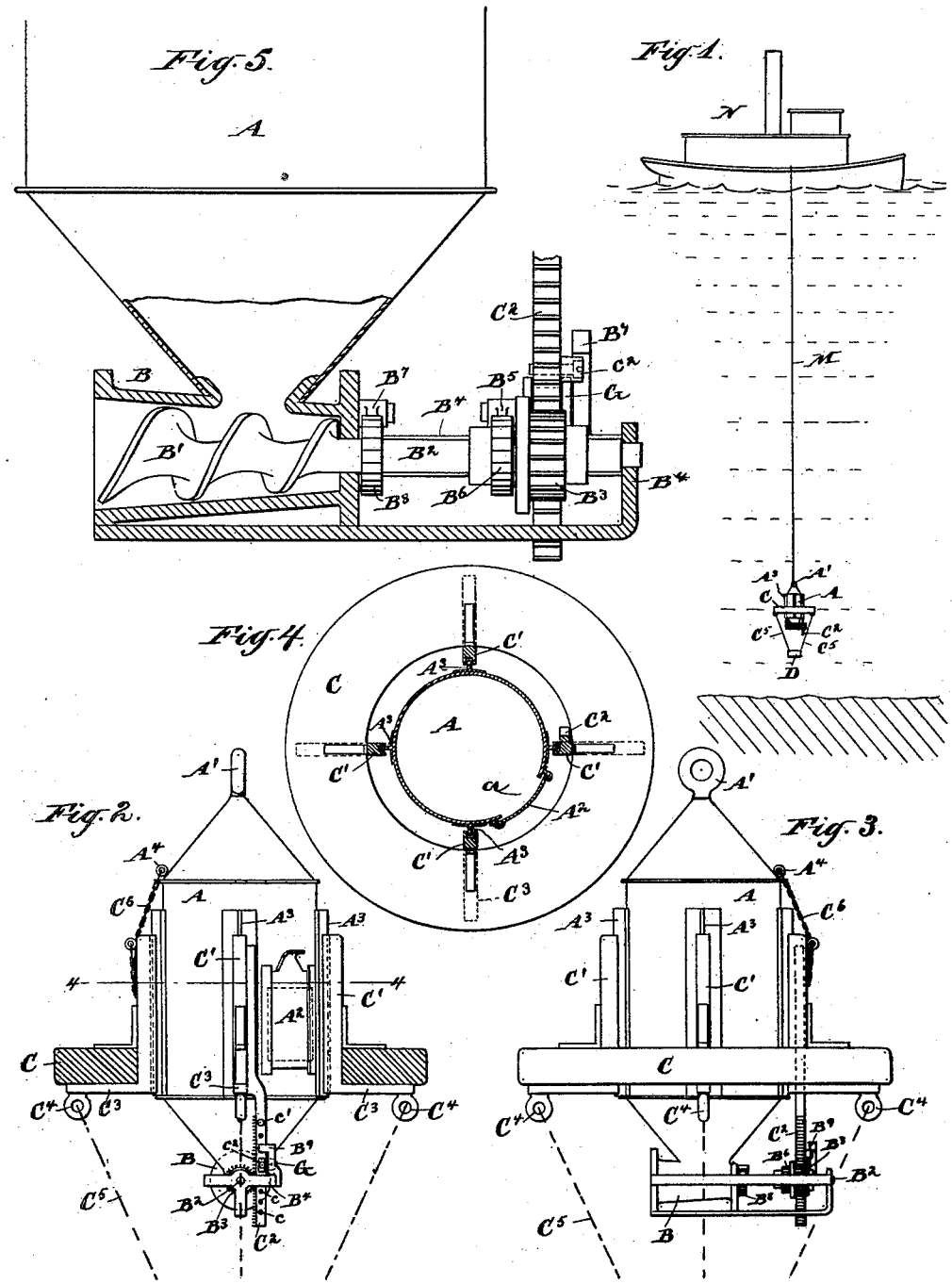

FERDINAND E. FORSTER, OF NEW YORK, N. Y.

CHUM-FEEDING MACHINE.

SPECIFICATION forming part of Letters Patent No. 695,921, dated March 25, 1902.

Application filed August 8, 1901. Serial No. 71,305. (No model.)

*To all whom it may concern:*

Be it known that I, FERDINAND E. FORSTER, a citizen of the United States, residing in the city of New York, borough of Manhattan, in the county and State of New York, have invented a certain new and useful Improvement in Chum-Feeding Machines, of which the following is a specification.

In using chum to attract fish in deep-water fishing it is desirable to distribute it near the bottom. I have devised an apparatus for this and analogous purposes in which the material is automatically discharged in the required small quantities at intervals and at any desired depth by the action of the waves on the water-surface.

The invention consists of an apparatus adapted to be suspended in a submerged position from a vessel, buoy, or other float on the surface. The machine comprises two portions, one of which is so shaped as to offer greater surface, and therefore greater resistance to the rising and sinking motion than the other, and thus cause them to correspondingly rise and sink relatively to each other. One portion serves as a receptacle for the chum and is provided with a distributing or feed mechanism operated by such changes in position. As I have carried out the invention a screw or worm at the bottom of the receptacle is caused to rotate at intervals by a rack and pinion operated by changes in position between the receptacle and an annular plate of considerable superficial area encircling the receptacle and offering greater resistance than the latter to the rising and sinking movements.

The invention also consists in certain details of construction and arrangement of parts to be hereinafter described.

The accompanying drawings form a part of this specification and show what I consider the best means of carrying out the invention.

Figure 1 is a general side view showing the apparatus attached to a vessel and in position for service. Fig. 2 is a side elevation, partly in vertical section, showing the receptacle and immediately adjacent parts on a larger scale. Fig. 3 is a corresponding side view taken at a right angle to Fig. 2. Fig. 4 is a horizontal section taken on the line 4 4 in Fig. 2. Fig. 5 is a vertical section, partly in elevation, corresponding to the lower portion of Fig. 2, but on a much larger scale.

Similar letters of reference indicate the same parts in all the figures.

A is the receptacle, preferably of sheet metal, having a cylindrical body and conical ends, the upper end carrying an eye A', by which it may be connected to a supporting-line M, shown as fastened to a vessel N. An opening $a$ in the body serves to allow the introduction of the chum and is closed by a sliding door or cover $A^2$. At the lower end is fastened a transverse tapering casing B, open at the large end and communicating at about the mid-length with the interior of the receptacle. It contains a screw or worm B', rotated by a shaft $B^2$, projecting through the closed smaller end of the casing, and carries a spur gear or pinion $B^3$. The overhung end of the shaft is supported in a portion of the framing $B^4$ secured to the casing B.

C is an annular plate of considerable area encircling the receptacle and having grooved uprights C', matching to vertical ribs or guide-flanges $A^3$ $A^3$ on the outer surface of the receptacle. From one of the uprights C' a rack $C^2$ extends downwardly and meshes with the pinion $B^3$ and is guided and supported by the framing $B^4$. The uprights are bent at a right angle to form arms $C^3$, extending radially outward to support the plate C, as shown. On the under face of each arm is an eye $C^4$, to which are attached short chains or lines $C^5$, supporting a weight or sinker D, suspended a short distance below the receptacle and serving to aid in maintaining the submerged machine in an upright position, and also allows the gravity of the plate to be increased or diminished by substituting a sinker of greater or less weight. The rack $C^2$ is provided with a series of holes $c$ $c$, in which are received two pins $c'$ $c^2$, one above and the other below the frame $B^9$, serving to limit the upward and downward movement of the plate and rack and correspondingly control the discharge of chum through the casing B. The pinion $B^3$ is loose on the shaft $B^2$ and carries a pawl $B^5$, engaging with a ratchet-wheel $B^6$, fixed on the shaft, so that the rack and pinion may move idly in one direction and turn the shaft effectively on the reverse or downward movement.

$C^6$ $C^6$ are short chains or lines attached to the uprights and secured to suitable eyes $A^4$ on the upper portion of the receptacle, where the chains are not likely to become entangled with the mechanism. They serve to connect these parts to insure against loss of the plate in the event of accident while submerged.

The entire apparatus is suspended sufficiently above the bottom to avoid contact of the weight D therewith. The rise and fall of the vessel or other sustaining float at the surface tends to correspondingly raise and lower both the receptacle and the plate; but as the latter lies with its broad face at a right angle to the motion, and therefore offers a greater resistance than the pointed receptacle, its movements are more sluggish and the result is a rising and sinking of the receptacle relatively to the plate, and through the action of the pinion $B^3$ and rack $C^2$ each change in one direction feeds a small quantity of chum from the mouth of the casing B, the amount being governed by the position of the pins $c'$ $c^2$, and the reverse movement turns the pinion idly, as will be readily understood.

The pins $c'$ $c^2$ are provided with substantial rectangular heads adapted to withstand the impact against the frame.

G is a flanged guide-roller mounted on an upward extension of the frame and serves to reduce the sliding friction of the rack and hold the latter in engagement with its pinion. I also provide a ratchet-wheel $B^6$ on the shaft $B^2$ adjacent to the closed end of the casing B, and a pawl $B^7$ on the latter serving to hold the shaft and its worm against reverse rotation during the idle upward movement of the rack.

Although I have shown and described what I consider a preferable form of the machine, it will be understood that modifications may be made in the forms and proportions and in the arrangement of parts within wide limits without departing from the principle of the invention or sacrificing its advantages.

Under conditions in which there is not sufficient wave motion to operate the apparatus successfully it may be raised and lowered intermittently by hand or otherwise.

I claim—

1. An apparatus adapted to be suspended in water and means for alternately raising and lowering it therein, the said apparatus comprising two portions, one offering greater resistance to such rising and sinking movements than the other, one of said portions free to move relatively to the first and serving as a receptacle for chum and having a feed mechanism, and the other portion adapted to operate said feed mechanism by the changes in relative positions of the two portions, all combined and arranged to serve substantially as herein specified.

2. An apparatus adapted to be suspended in water from a float subject to the rising and falling action of the waves and to partake in such motion, comprising two portions, one offering greater resistance to such motion than the other, one of said portions serving as a receptacle for chum and having a feed mechanism, and the other portion free to move relatively to the first and adapted to operate said feed mechanism by the changes in relative positions of the two portions, all combined and arranged to serve substantially as herein specified.

3. A receptacle adapted to be suspended in water from a float subject to the rising and falling action of the waves, a plate connected to said receptacle and free to move relatively thereto and formed to resist such rising and sinking movements, and a feed mechanism operated by the changes in relative positions of said receptacle and plate, all combined and arranged to serve substantially as herein specified.

4. A receptacle adapted to contain chum and to be suspended in water from a float subject to the rising and falling action of the waves and to partake in such motion, an annular plate encircling said receptacle and guided thereon and adapted to offer greater resistance to such motion than said receptacle, in combination with a feed mechanism on said receptacle and means for operating it by changes in relative positions of said receptacle and plate, all substantially as herein specified.

5. A receptacle adapted to contain chum, an annular plate encircling said receptacle and free to rise and sink relatively thereto, a feed mechanism on said receptacle, and means for operating it by the rising and sinking of said receptacle relatively to said plate, all combined substantially as herein specified.

6. The receptacle A and casing B thereon having the feed-screw $B'$ therein, the shaft $B^2$ for the latter, and pinion $B^3$, ratchet $B^6$ and pawl $B^5$ carried on said shaft, in combination with the plate C and rack $C^2$ thereon adapted to engage said pinion and to turn said feed-screw by the rising and sinking of said receptacle relatively to said plate, substantially as herein specified.

7. The receptacle A adapted to contain chum, and the casing B thereon containing the feed-screw $B'$, shaft $B^2$ for the latter, and the pinion $B^3$, ratchet $B^6$ and pawl $B^5$ carried on said shaft, in combination with the annular plate C encircling said receptacle and guided thereon, the rack $C^2$ carried by said plate and engaged with said pinion to turn said feed-screw by the rising and sinking of said receptacle relatively to said plate, and means as the series of holes $c$ in said rack and the pins $c'$ $c^2$ and frame $B^9$ for limiting the extent of such relative motion and thereby controlling the amount of chum delivered by said feed-screw, substantially as and for the purposes herein set forth.

8. In an apparatus for delivering chum, the receptacle A and casing B thereon containing the feed-screw B', the shaft B² for the latter, and the pinion B³, ratchet B⁶ and pawl B⁵ carried on said shaft, in combination with the annular plate C, rack C² carried thereon and adapted to engage said pinion, the flexible connections from said plate to a suspended sinker D, and connections from the plate to the upper portion of said receptacle, the whole adapted to be submerged and suspended from a float at the water-surface and be operated by the action of waves on said float, all substantially as herein specified.

In testimony that I claim the invention above set forth I affix my signature in presence of two witnesses.

FERDINAND E. FORSTER.

Witnesses:
ROBT. CONNOR,
CHARLES R. SEARLE.